US009260042B2

(12) United States Patent
Orson (10) Patent No.: US 9,260,042 B2
(45) Date of Patent: Feb. 16, 2016

(54) FOLDABLE ARMREST

(71) Applicant: ZODIAC SEAT SHELLS US LLC, Santa Maria, CA (US)

(72) Inventor: Benjamin R. Orson, Kent (GB)

(73) Assignee: Zodiac Seat Shells U.S. LLC, Santa Maria, CA (US)

( * ) Notice: Subject to any disclaimer, the term of this patent is extended or adjusted under 35 U.S.C. 154(b) by 0 days.

(21) Appl. No.: 14/306,906

(22) Filed: Jun. 17, 2014

(65) Prior Publication Data

US 2014/0368018 A1    Dec. 18, 2014

Related U.S. Application Data

(60) Provisional application No. 61/835,666, filed on Jun. 17, 2013.

(51) Int. Cl.
*B60N 2/46* (2006.01)
*A47C 7/54* (2006.01)
*B64D 11/06* (2006.01)
*B60N 2/02* (2006.01)

(52) U.S. Cl.
CPC .......... *B60N 2/4606* (2013.01); *B64D 11/0644* (2014.12); *B60N 2002/0208* (2013.01)

(58) Field of Classification Search
CPC .............. B60N 2/4606; B60N 2002/0208; B64D 11/0644
USPC ............................................ 297/113, 411.32
See application file for complete search history.

(56) References Cited

U.S. PATENT DOCUMENTS

| | | | | |
|---|---|---|---|---|
| 4,435,011 A * | 3/1984 | Hakamata | ...................... | 297/113 |
| 5,476,307 A * | 12/1995 | Whalen | ..................... | 297/411.32 |
| 5,658,043 A * | 8/1997 | Davidson | ...................... | 297/113 |
| 5,752,739 A * | 5/1998 | Saeki | ............................. | 297/113 |
| 5,941,603 A * | 8/1999 | Wein | ......................... | 297/411.32 |
| 5,984,416 A * | 11/1999 | Waldo et al. | .............. | 297/411.32 |
| 6,047,444 A * | 4/2000 | Braun | ....................... | 297/411.32 |
| 6,050,645 A * | 4/2000 | Bradbury | ................. | 297/411.32 |
| 6,238,002 B1 * | 5/2001 | Brewer et al. | ............ | 297/411.32 |
| 6,361,114 B1 * | 3/2002 | Rumler | .................... | 297/411.32 |
| 6,471,297 B1 * | 10/2002 | Runde et al. | ............. | 297/411.32 |
| 8,016,359 B2 * | 9/2011 | Dillinger et al. | ......... | 297/411.32 |
| 8,449,029 B2 * | 5/2013 | Runde | .......................... | 297/113 |
| 8,827,369 B2 * | 9/2014 | Izawa et al. | .............. | 297/411.32 |
| 2004/0124687 A1* | 7/2004 | Nae et al. | ................. | 297/411.32 |
| 2007/0085404 A1* | 4/2007 | Chen et al. | ............... | 297/411.32 |

(Continued)

*Primary Examiner* — Rodney B White
(74) *Attorney, Agent, or Firm* — Kilpatrick Townsend & Stockton LLP; Dean W. Russell, Esq.; Tiffany L. Williams, Esq.

(57) ABSTRACT

Described are pivotable armrests having a first pivot assembly with a housing and a pivot plate pivotally coupled to the housing, a second pivot assembly with a coupling projection extending from a circumferential surface of the pivot plate, an armpad pivotally coupled to the coupling projection, and the housing includes a receptacle having a receptacle surface. The armpad has a longitudinal axis arranged in an elongated direction of the armpad and a lateral axis arranged perpendicular to the longitudinal axis and extending in a plane parallel to at least one of an upper surface and a lower surface of the armpad. When the pivotable armrest is in a stowed position, the coupling projection and the longitudinal axis of the armpad are substantially vertically oriented and the lateral axis of the armpad is substantially parallel with a receptacle surface of the housing.

16 Claims, 5 Drawing Sheets

(56) References Cited

U.S. PATENT DOCUMENTS

| | | | |
|---|---|---|---|
| 2009/0167070 A1* | 7/2009 | Chen et al. | 297/411.32 |
| 2009/0184559 A1* | 7/2009 | Nakaya et al. | 297/411.32 |
| 2011/0115275 A1* | 5/2011 | Von Rothkirch Und Panthen et al. | 297/411.32 |
| 2011/0316310 A1* | 12/2011 | Runde | 297/113 |
| 2015/0108815 A1* | 4/2015 | Bhat et al. | 297/411.32 |

* cited by examiner

FOLDABLE ARMREST

CROSS REFERENCE TO RELATED APPLICATIONS

This application is related to and claims priority benefits from U.S. Provisional Application Ser. No. 61/835,666 ("the '666 application"), filed on Jun. 17, 2013, entitled FOLDABLE ARMREST PRINCIPALLY FOR AIRCRAFT PASSENGER SEAT. The '666 application is hereby incorporated in its entirety by this reference.

FIELD OF THE INVENTION

The field of the invention relates to passenger seat assemblies. More specifically, it relates to armrests of passenger seat assemblies.

BACKGROUND

Many passenger seat assemblies, such as those on passenger aircrafts, buses, trains, and the like, are arranged so that each passenger seat contains one or more armrests. On many business class seats, the armrest comprises a telescopic assembly. In these arrangements, the armrest deploys and moves vertically from a stowed position adjacent the seat. This telescopic armrest is composed of many moving parts and can be difficult to assemble. Furthermore, the armrest and any needed mechanisms for deployment take up significant space that can be otherwise used as additional stowage.

Thus, there may exist a need for an improved armrest assembly having a design that may be stowed in a manner that is out of the view and useable area of passengers and may be deployed through a series of minimal moving parts that are easy to assemble and require minimal space.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a pivotable armrest comprises a first pivot assembly comprising a housing and a pivot plate pivotally coupled to the housing, a second pivot assembly comprising a coupling projection extending from a circumferential surface of the pivot plate, an armpad pivotally coupled to the coupling projection, and the housing comprising a receptacle.

In some embodiments, the receptacle partially surrounds the circumferential surface of the pivot plate and is shaped to limit a rotational path of the pivot plate by engaging at least one location on the circumferential surface of the pivot plate. The circumferential surface of the pivot plate may comprise a straight region having a first end and a second end. The receptacle may comprise a projection that is configured to engage the first end of the straight region when the pivotable armrest is rotated into a stowed position. The projection may also be configured to engage the second end of the straight region when the pivotable armrest is rotated into a deployed or semi-deployed position. In certain embodiments, the pivot plate has an overall shape of a circle segment.

In some embodiments, the armpad comprises a longitudinal axis arranged in an elongated direction of the armpad and a lateral axis arranged perpendicular to the longitudinal axis and extending in a plane parallel to at least one of an upper surface and a lower surface of the armpad. In these embodiments, the coupling projection and the longitudinal axis of the armpad are substantially vertically oriented and the lateral axis of the armpad is substantially parallel with a receptacle surface of the housing when the pivotable armrest is in a stowed position.

In certain embodiments, the coupling projection and the longitudinal axis of the armpad are substantially horizontally oriented and the lateral axis of the armpad is substantially parallel to a horizontal plane when the pivotable armrest is in a deployed position.

In additional embodiments, the coupling projection and the longitudinal axis of the armpad are substantially horizontally oriented and the lateral axis of the armpad is substantially parallel with the receptacle surface of the housing when the pivotable armrest is in a semi-deployed position.

In some embodiments, the housing is coupled to an interior surface of a privacy shell positioned proximate a passenger seat.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide pivotable armrests for passenger seats. While the pivotable armrests are discussed for use with aircraft seats, they are by no means so limited. Rather, embodiments of the pivotable armrests may be used in passenger seats or other seats of any type or otherwise as desired.

According to certain embodiments of the present invention, as shown in FIGS. 1-5, a pivotable armrest 10 comprises a first pivot assembly 12 (also known as a longitudinal pivot) and a second pivot assembly 14 (also known as a transverse pivot). The first pivot assembly 12 and/or the second pivot assembly 14 may be formed of materials including but not limited to aluminum, stainless steel, aramid fibers, polycarbonate, polypropylene, other metallic materials, composite materials, or other similar materials as needed or desired.

In certain embodiments, the first pivot assembly 12 comprises a stationary housing 16 and a pivot plate 18. The housing 16 may further comprise a base 22 and a lip 24. The base 22 may be formed from a substantially flat layer of material having a mounting surface 26 and a receptacle surface 28. The lip 24 may be formed from another layer of material that is connected to the receptacle surface 28 of the base 22. The lip 24 is shaped so that it covers a first portion of the base 22, while leaving a second portion of the base 22 exposed. As a result, the exposed area of the base 22 forms a receptacle 30 having a bounded section 32 formed by an edge 36 of the lip 24 and an unbounded section 34 that is located between ends of the edge 36. In certain embodiments, the lip 24 may be a separate material that is adhered to the receptacle surface 28. In other embodiments, the base 22 and the lip 24 may be integrally formed from a single piece of material by removing a portion of the base 22 to form the receptacle 30.

The pivot plate 18 comprises a substantially flat pivot surface 38 and an outer surface 40. The pivot surface of the pivot plate 18 is pivotally coupled to the housing 16 proximate the receptacle surface 28 of the base 22 via a pivot shaft or other similar fastener so that the pivot plate 18 rotates within a longitudinal plane that is substantially parallel to the receptacle surface 28. The degree of rotation of the pivot plate 18 may be controlled by the circumferential shape of the pivot plate 18 and the shape of the edge 36 that forms the bounded section 32 of the receptacle 30. For example, in certain embodiments, the pivot plate 18 may have an outer circumferential surface 42 comprising a circular region 44 and a straight region 46. In geometric terms, the pivot plate 18 may have an overall shape of a major (or minor) circle segment that is enclosed by the circumferential shape of the circular region 44 and the line (or chord) formed by the straight region 46. The length of the arc formed by the circular region 44, which is controlled at least in part by the placement of the straight region 46 relative to the diameter of the pivot plate 18, controls the rotational distance between a first end 48 and a second end 50 of the straight region 46.

Figure 1:
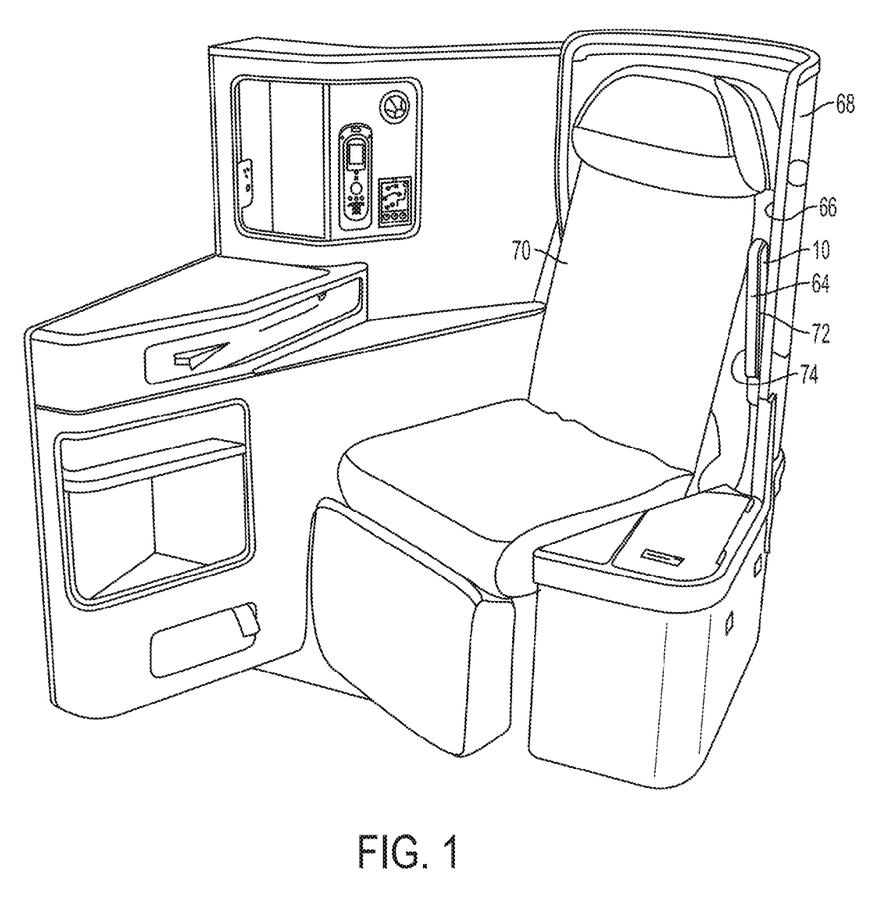
FIG. 1 is a perspective view of a passenger seat comprising a pivotable armrest in a stowed position, according to certain embodiments of the present invention.
Figure 2:
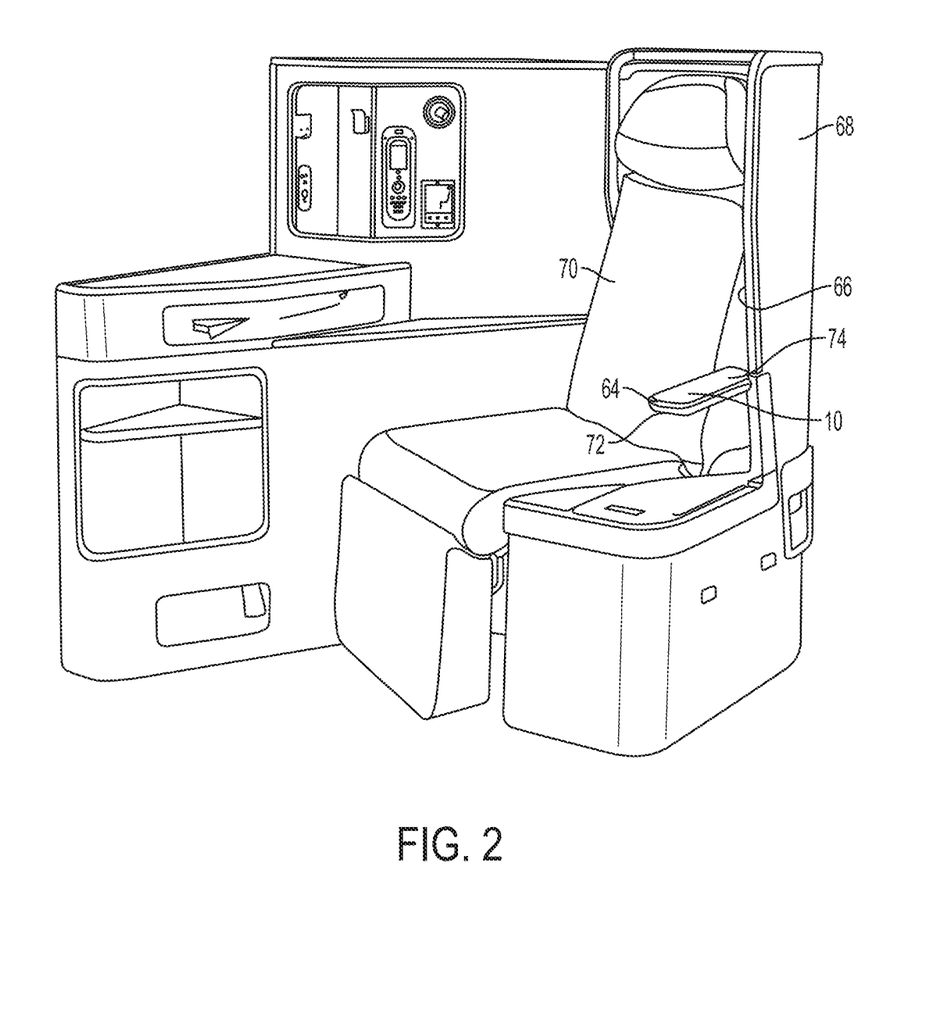
FIG. 2 is a perspective view of the passenger seat of FIG. 1 comprising the pivotable armrest in a deployed position.
Figure 3:
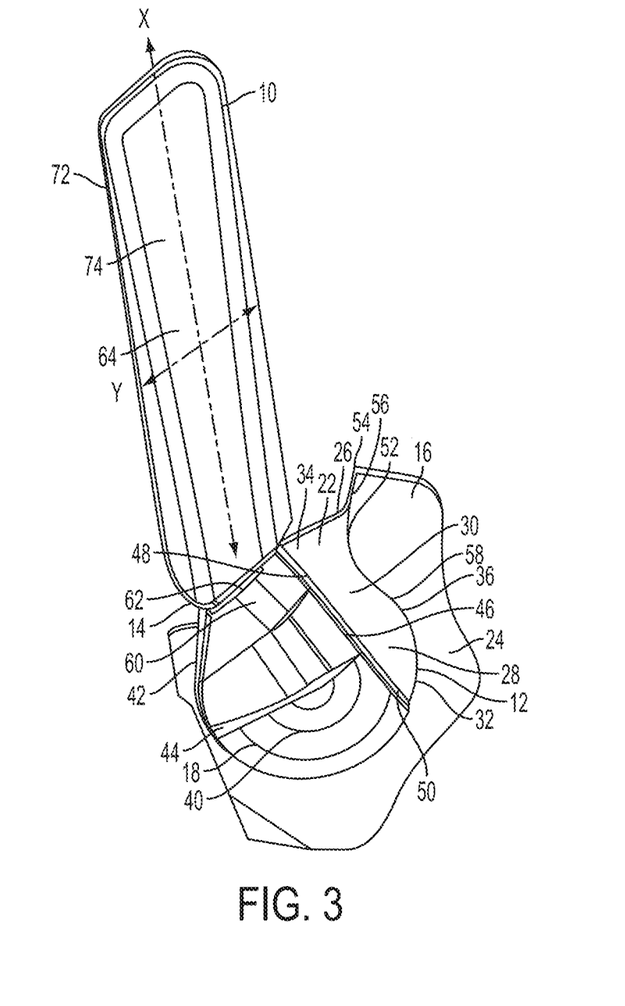
FIG. 3 is a perspective view of the pivotable armrest of FIG. 1 in the stowed position.
Figure 4:
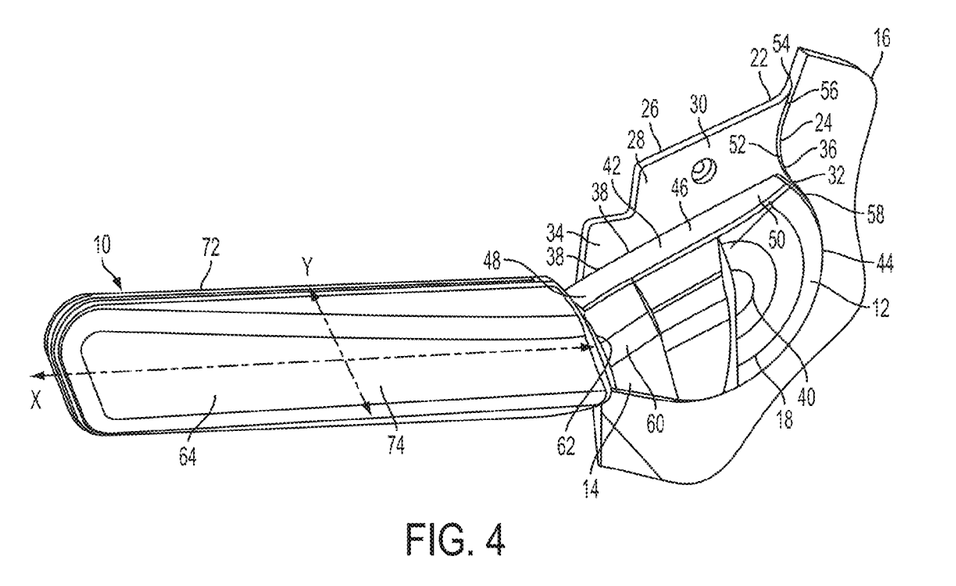
FIG. 4 is a perspective view of the pivotable armrest of FIG. 1 in the semi-deployed position.
Figure 5:
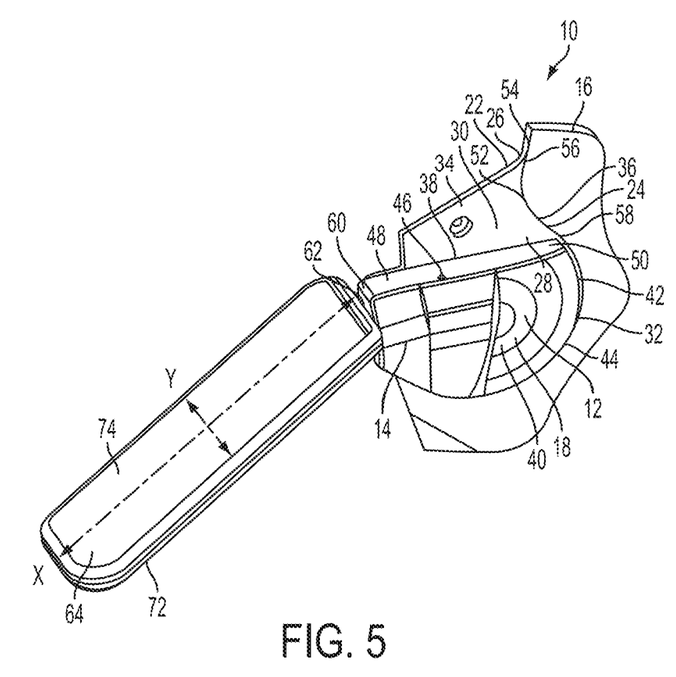
FIG. 5 is a perspective view of the pivotable armrest of FIG. 1 in the deployed position.

The edge 36 of the lip 24 may include at least one projection 52 that is configured to contact the first end 48 and/or the second end 50 of the straight region 46 at the respective ends of the rotational path of the pivot plate 18. For example, as best shown in FIGS. 3-5, a single projection 52 is positioned at an upper end 54 of the edge 36. An upper side 56 of the projection 52 is configured to contact the first end 48 of the straight region 46 when the rotation of the pivot plate 18 reaches a first end of the rotational path, which coincides with a stowed position (as shown in FIGS. 1 and 3) of the pivotable armrest 10, explained in more detail below. In these embodiments, a lower side 58 of the projection 52 is configured to contact the second end 50 of the straight region 46 when the rotation of the pivot plate 18 reaches a second end of the rotational path, which coincides with a semi-deployed (as shown in FIG. 4) and deployed (as shown in FIGS. 2 and 5) positions of the pivotable armrest 10, also explained in more detail below.

In other embodiments, among other possibilities, the length of the rotational path of the pivot plate 18 may be adjusted through the addition of a second projection 52 below the location of the first projection 52, widening or narrowing the size of the single projection 52, and/or moving the location of the straight region 46 closer to or farther from the diameter of the pivot plate 18.

In certain embodiments, as best shown in FIGS. 3-5, a coupling projection 60 may be incorporated into the circumferential surface 42 of the pivot plate 18. For example, the coupling projection 60 may be positioned along the circumferential surface 42 between the circular region 44 and the first end 48 of the straight region 46 so that the coupling projection 60 is always positioned within the unbounded section 34 of the receptacle 30.

An additional housing may be included proximate the outer surface 40 of the pivot plate 18 to enclose the pivot plate 18 as a way to avoid potential pinch points that may be created by the rotation of the pivot plate 18. The housing may include an open slot through which the coupling projection 60 may extend, and the slot may be sized to mate with the unbounded section 34 of the receptacle 30 so as to not impede with the rotational movement of the coupling projection 60 and/or the pivot plate 18.

The coupling projection 60 may comprise a pivot shaft 62 or other pivotable coupling device so that the combination forms the second pivot assembly 14. In certain embodiments, as shown in FIGS. 1-5, an armpad 64 is pivotally coupled to the pivot shaft 62 so that the armpad 64 may laterally rotate relative to the coupling projection 60. The armpad 64 may have a generally rectilinear shape with a longitudinal axis X arranged in the elongated direction of the armpad 64 and a lateral axis Y arranged perpendicular to the longitudinal axis X and extending in a plane parallel to at least one of an lower surface 72 and an upper surface 74 of the armpad 64.

The armpad 64 may be formed of materials including but not limited to aluminum, stainless steel, aramid fibers, polycarbonate, polypropylene, other metallic materials, composite materials, or other similar materials as needed or desired. In certain embodiments, a cushion may be attached to one or more surfaces of the armpad 64 to provide additional passenger comfort during use.

The coupling projection 60 may further comprise one or more stops that limit the lateral rotation of the armpad 64 between a first end of a rotation path that coincides with the stowed (as shown in FIGS. 1 and 3) and semi-deployed (as shown in FIG. 4) positions of the pivotable armrest 10, explained in more detail below, and a second end of the rotational path that coincides with the deployed position (as shown in FIGS. 2 and 5) of the pivotable armrest 10, also explained in more detail below.

In certain embodiments, the pivotable armrest 10 is attached to an interior surface 66 of a monument or privacy shell 68 positioned proximate a passenger seat 70. In particular, the mounting surface 26 of the base 22 may be coupled to the interior surface 66 via double brackets and fasteners. However, a person of ordinary skill in the relevant art will understand that any suitable connection means may be used including but not limited to screws, bolts, rivets, or other mechanical or chemical fasteners. Furthermore, the pivotable armrest 10 may be used with any passenger seat 70 design, including those where the pivotable armrest 10 may attach directly to a seat frame instead of a monument or privacy shell 68.

In use, the pivotable armrest 10 is configured to rotate between the stowed position (as shown in FIGS. 1 and 3), the semi-deployed position (as shown in FIG. 4), and the deployed position (as shown in FIGS. 2 and 5).

To reach the stowed position, the pivot plate 18 is rotated until the first end 48 of the straight region 46 contacts the upper side 56 of the projection 52. In this position, the coupling projection 60 is substantially vertically oriented, which causes the longitudinal axis X of the armpad 64 to also be substantially vertically oriented.

In the stowed position, the armpad 64 is laterally rotated into the first position of the rotation path of the second pivot assembly 14, wherein the lateral axis Y of the armpad 64 is also oriented substantially parallel to the receptacle surface 28 of the housing 16. In this orientation, a lower surface 72 of the armpad 64 faces toward the interior surface 66 of the monument or privacy shell 68, and an upper surface 74 of the armpad 64 faces away from the interior surface 66. In other embodiments, the converse orientation of the armpad 64 may be employed, wherein the lower surface 72 of the armpad 64 faces away the interior surface 66, and the upper surface 74 of the armpad 64 faces toward the interior surface 66. By orienting the armpad 64 in this manner in the stowed position, the amount of stowage space required for the pivotable armrest 10 is minimized to accommodate the thickness of the armpad 64 (and any combined thicknesses of the stationary housing 16, pivot plate 18, and/or additional housing that may have that exceed the thickness of the armpad 64), rather than the width of the lower and upper surfaces 72, 74 of the armpad 64.

To transition the pivotable armrest 10 into the semi-deployed position, the pivot plate 18 is rotated so that the first end 48 of the straight region 46 is no longer in contact with the upper side 56 of the projection 52 and rotation continues until the second end 50 of the straight region 46 contacts the lower side 58 of the projection 52. At this point, the coupling projection 60 is substantially horizontally oriented, which causes the longitudinal axis X of the armpad 64 to also be substantially horizontally oriented, as best illustrated in FIG. 4.

In the semi-deployed position, the armpad 64 remains laterally rotated into the first position of the rotation path of the second pivot assembly 14, as described above with respect to the stowed position. The only difference is that the lower surface 72 (or upper surface 74 in a converse arrangement) has rotated away from the stowed position proximate the interior surface 66 so that the lower surface 72 (or upper surface 74 in a converse arrangement) is no longer facing the interior surface 66.

To transition the pivotable armrest 10 into the deployed position, the armpad 64 is laterally rotated into the second position of the rotation path of the second pivot assembly 14, wherein the lateral axis Y of the armpad 64 is oriented substantially parallel to a horizontal plane. In this orientation, the lower surface 72 of the armpad 64 faces downward, and the upper surface 74 of the armpad 64 faces upward. In other embodiments, the converse orientation of the armpad 64 may be employed, wherein the lower surface 72 of the armpad 64 faces upward, and the upper surface 74 of the armpad 64 faces downward. In any event, the armpad 64 is oriented in the deployed position so that the surface that is intended to contact a passenger's arm is oriented upward, whether that be the upper surface 74 or the lower surface 72.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A pivotable armrest comprising:
   a first pivot assembly comprising a housing and a pivot plate pivotally coupled to the housing;
   a second pivot assembly comprising a coupling projection extending from a circumferential surface of the pivot plate;
   an armpad pivotally coupled to the coupling projection; and
   the housing comprising a receptacle partially surrounding the circumferential surface of the pivot plate and shaped to limit a rotational path of the pivot plate by engaging at least one location on the circumferential surface of the pivot plate;
   wherein the circumferential surface of the pivot plate comprises a straight region having a first end and a second end.

2. The pivotable armrest of claim 1, wherein the receptacle comprises a projection that is configured to engage the first end of the straight region when the pivotable armrest is rotated into a stowed position.

3. The pivotable armrest of claim 2, wherein the projection is configured to engage the second end of the straight region when the pivotable armrest is rotated into a deployed or semi-deployed position.

4. The pivotable armrest of claim 3, wherein the pivot plate has an overall shape of a circle segment.

5. A pivotable armrest comprising:
   a first pivot assembly comprising a housing and a pivot plate pivotally coupled to the housing;
   a second pivot assembly comprising a coupling projection extending from a circumferential surface of the pivot plate;
   an armpad pivotally coupled to the coupling projection; and
   the housing comprising a receptacle partially surrounding the circumferential surface of the pivot plate and shaped to limit a rotational path of the pivot plate by engaging at least one location on the circumferential surface of the pivot plate;
   wherein the armpad comprises a longitudinal axis arranged in an elongated direction of the armpad and a lateral axis arranged perpendicular to the longitudinal axis and extending in a plane parallel to at least one of an upper surface and a lower surface of the armpad, and
   wherein the coupling projection and the longitudinal axis of the armpad are substantially vertically oriented and the lateral axis of the armpad is substantially parallel with a receptacle surface of the housing when the pivotable armrest is in a stowed position.

6. The pivotable armrest of claim 5, wherein the coupling projection and the longitudinal axis of the armpad are substantially horizontally oriented and the lateral axis of the armpad is substantially parallel to a horizontal plane when the pivotable armrest is in a deployed position.

7. The pivotable armrest of claim 6, wherein the coupling projection and the longitudinal axis of the armpad are substantially horizontally oriented and the lateral axis of the armpad is substantially parallel with the receptacle surface of the housing when the pivotable armrest is in a semi-deployed position.

8. The pivotable armrest of claim 1, wherein the housing is coupled to an interior surface of a privacy shell positioned proximate a passenger seat.

9. A pivotable armrest comprising:
   a first pivot assembly comprising a housing and a pivot plate, wherein the housing comprises a receptacle having a receptacle surface and the pivot plate is pivotally coupled to the housing proximate the receptacle surface;

a second pivot assembly comprising a coupling projection extending from a circumferential surface of the pivot plate;

an armpad pivotally coupled to the coupling projection, wherein the armpad comprises a longitudinal axis arranged in an elongated direction of the armpad and a lateral axis arranged perpendicular to the longitudinal axis and extending in a plane parallel to at least one of an upper surface and a lower surface of the armpad; and wherein the coupling projection and the longitudinal axis of the armpad are substantially vertically oriented and the lateral axis of the armpad is substantially parallel with the receptacle surface of the housing when the pivotable armrest is in a stowed position;

wherein the circumferential surface of the pivot plate comprises a straight region having a first end and a second end, and the receptacle is shaped to engage the first end when the pivotable armrest is in the stowed position, and is shaped to engage the second end when the pivotable armrest is in a deployed position or a semi-deployed position.

10. The pivotable armrest of claim 9, wherein the receptacle partially surrounds the circumferential surface of the pivot plate and is shaped to engage a location on the circumferential surface of the pivot plate when the pivotable armrest is in the stowed position.

11. The pivotable armrest of claim 10, wherein the receptacle is shaped to engage a second location on the circumferential surface of the pivot plate when the pivotable armrest is in a deployed position or a semi-deployed position.

12. A pivotable armrest comprising:
a first pivot assembly comprising a housing and a pivot plate, wherein the housing comprises a receptacle having a receptacle surface and the pivot plate is pivotally coupled to the housing proximate the receptacle surface;

a second pivot assembly comprising a coupling projection extending from a circumferential surface of the pivot plate; and an armpad pivotally coupled to the coupling projection, wherein the armpad comprises a longitudinal axis arranged in an elongated direction of the armpad and a lateral axis arranged perpendicular to the longitudinal axis and extending in a plane parallel to at least one of an upper surface and a lower surface of the armpad;

wherein the coupling projection and the longitudinal axis of the armpad are substantially vertically oriented and the lateral axis of the armpad is substantially parallel with the receptacle surface of the housing when the pivotable armrest is in a stowed position; and wherein the coupling projection and the longitudinal axis of the armpad are substantially horizontally oriented and the lateral axis of the armpad is substantially parallel to a horizontal plane when the pivotable armrest is in a deployed position.

13. The pivotable armrest of claim 12, wherein the coupling projection and the longitudinal axis of the armpad are substantially horizontally oriented and the lateral axis of the armpad is substantially parallel with the receptacle surface of the housing when the pivotable armrest is in a semi-deployed position.

14. The pivotable armrest of claim 9, wherein the housing is coupled to an interior surface of a privacy shell positioned proximate a passenger seat.

15. A method of stowing a pivotable armrest comprising a first pivot assembly comprising a housing and a pivot plate, wherein the housing comprises a receptacle having a receptacle surface and the pivot plate is pivotally coupled to the housing, a second pivot assembly comprising a coupling projection extending from a circumferential surface of the pivot plate, and an armpad pivotally coupled to the coupling projection, wherein the armpad comprises a longitudinal axis arranged in an elongated direction of the armpad and a lateral axis perpendicular to the longitudinal axis and extending in a plane parallel to at least one of an upper surface and a lower surface of the armpad, the method comprising:
rotating the armpad relative to the coupling projection until the lateral axis of the armpad is substantially parallel to the receptacle surface of the housing;
rotating the pivot plate until the longitudinal axis of the armpad is substantially vertical; and
engaging a location on the circumferential surface of the pivot plate with at least one projection located on the receptacle, wherein the location on the circumferential surface comprises a first end of a straight region.

16. The method of claim 15, further comprising deploying the pivotable armrest by
rotating the pivot plate until the longitudinal axis of the armpad is substantially horizontal; and
rotating the armpad relative to the coupling projection until the lateral axis of the armpad is substantially parallel to a horizontal plane.

* * * * *